US008938594B2

(12) United States Patent
Moore et al.

(10) Patent No.: US 8,938,594 B2
(45) Date of Patent: Jan. 20, 2015

(54) METHOD AND SYSTEM FOR METADATA-BASED RESILVERING

(75) Inventors: William H. Moore, Freemont, CA (US); Jeffrey S. Bonwick, Los Altos, CA (US); Matthew A. Ahrens, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1290 days.

(21) Appl. No.: 11/407,719

(22) Filed: Apr. 19, 2006

(65) Prior Publication Data
US 2007/0106866 A1 May 10, 2007

Related U.S. Application Data

(60) Provisional application No. 60/734,023, filed on Nov. 4, 2005.

(51) Int. Cl.
G06F 12/00 (2006.01)
G06F 13/28 (2006.01)
G06F 13/00 (2006.01)
G06F 11/20 (2006.01)

(52) U.S. Cl.
CPC ................... *G06F 11/2082* (2013.01)
USPC ............. 711/162; 711/117; 711/E12.103

(58) Field of Classification Search
USPC ........................................ 711/162
See application file for complete search history.

(56) References Cited

U.S. PATENT DOCUMENTS

| | | | |
|---|---|---|---|
| 4,144,522 A | 3/1979 | Kageyama et al. | |
| 4,209,845 A | 6/1980 | Berger et al. | |
| 5,129,085 A | 7/1992 | Yamasaki | |
| 5,155,847 A | 10/1992 | Kirouac et al. | |
| 5,274,803 A | 12/1993 | Dubin et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 5,953,742 A | 9/1999 | Williams | |
| 6,209,111 B1 | 3/2001 | Kadyk et al. | |
| 6,341,341 B1 | 1/2002 | Grummon et al. | |
| 6,536,033 B1 | 3/2003 | Weerawarana et al. | |
| 6,578,120 B1 * | 6/2003 | Crockett et al. ............... | 711/162 |
| 6,704,838 B2 * | 3/2004 | Anderson ...................... | 711/114 |
| 6,745,284 B1 | 6/2004 | Lee et al. | |

(Continued)

OTHER PUBLICATIONS

Johnson, J. E. et al.; "Overview of the Spiralog File System", Digital Technical Journal, vol. 8, No. 2, 1996, pp. 5-14 (10 pages).

(Continued)

*Primary Examiner* — Edward Dudek, Jr.
*Assistant Examiner* — Matthew Chrzanowski
(74) *Attorney, Agent, or Firm* — Osha Liang LLP

(57) ABSTRACT

A method for resilvering a storage pool includes determining whether any of a first plurality of blocks in the storage pool, comprising metadata, require resilvering, determining whether any of a second plurality of blocks in the storage pool, comprising data, require resilvering, resilvering all of the first plurality of blocks that require resilvering, and resilvering all of the second plurality of blocks that require resilvering, wherein all of the first plurality of blocks that require resilvering are resilvered prior to resilvering any of the second plurality of blocks.

15 Claims, 6 Drawing Sheets

(56) References Cited

U.S. PATENT DOCUMENTS

| | | | |
|---|---|---|---|
| 6,745,305 B2 | 6/2004 | McDowell | |
| 6,795,966 B1 | 9/2004 | Lim et al. | |
| 6,820,098 B1 | 11/2004 | Ganesh et al. | |
| 6,829,617 B2 | 12/2004 | Sawdon et al. | |
| 6,842,834 B2* | 1/2005 | Crockett et al. | 711/162 |
| 6,857,001 B2 | 2/2005 | Hitz et al. | |
| 6,880,051 B2 | 4/2005 | Timpanaro-Perrotta | |
| 6,892,211 B2 | 5/2005 | Hitz et al. | |
| 6,977,787 B2 | 12/2005 | Ito | |
| 6,981,114 B1 | 12/2005 | Wu et al. | |
| 7,007,196 B2 | 2/2006 | Lee et al. | |
| 7,024,427 B2* | 4/2006 | Bobbitt et al. | 707/200 |
| 7,032,154 B2 | 4/2006 | Kidorf et al. | |
| 7,039,661 B1 | 5/2006 | Ranade | |
| 7,043,677 B1 | 5/2006 | Li | |
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,197,599 B2 | 3/2007 | Corrado | |
| 7,200,715 B2 | 4/2007 | Kleiman et al. | |
| 7,272,613 B2* | 9/2007 | Sim et al. | 707/102 |
| 7,305,579 B2* | 12/2007 | Williams | 714/7 |
| 7,340,572 B2 | 3/2008 | Cochran | |
| 7,340,640 B1 | 3/2008 | Karr et al. | |
| 7,373,520 B1* | 5/2008 | Borthakur et al. | 713/189 |
| 7,389,379 B1 | 6/2008 | Goel et al. | |
| 7,389,396 B1 | 6/2008 | Goel et al. | |
| 7,392,425 B1 | 6/2008 | Schoenthal et al. | |
| 7,395,378 B1 | 7/2008 | Pendharkar et al. | |
| 7,467,265 B1 | 12/2008 | Tawri et al. | |
| 7,657,796 B1 | 2/2010 | Kaiser et al. | |
| 7,669,032 B2 | 2/2010 | Karr et al. | |
| 7,680,839 B1 | 3/2010 | Krishnamurthy et al. | |
| 7,689,609 B2 | 3/2010 | Lango et al. | |
| 2002/0004883 A1 | 1/2002 | Nguyen et al. | |
| 2002/0055942 A1 | 5/2002 | Reynolds | |
| 2002/0087788 A1 | 7/2002 | Morris | |
| 2002/0091670 A1* | 7/2002 | Hitz et al. | 707/1 |
| 2002/0161972 A1 | 10/2002 | Talagala et al. | |
| 2003/0033477 A1 | 2/2003 | Johnson et al. | |
| 2003/0041211 A1 | 2/2003 | Merkey et al. | |
| 2003/0070043 A1 | 4/2003 | Merkey | |
| 2003/0084242 A1* | 5/2003 | Strange et al. | 711/114 |
| 2003/0126107 A1 | 7/2003 | Yamagami | |
| 2003/0145167 A1 | 7/2003 | Tomita | |
| 2003/0158834 A1 | 8/2003 | Sawdon et al. | |
| 2003/0170012 A1 | 9/2003 | Cochran | |
| 2003/0177322 A1* | 9/2003 | Crockett et al. | 711/161 |
| 2003/0177324 A1* | 9/2003 | Timpanaro-Perrotta | 711/162 |
| 2003/0182313 A1 | 9/2003 | Federwisch et al. | |
| 2004/0024973 A1 | 2/2004 | Chron et al. | |
| 2004/0030822 A1 | 2/2004 | Rajan et al. | |
| 2004/0098720 A1 | 5/2004 | Hooper | |
| 2004/0107314 A1 | 6/2004 | Kim et al. | |
| 2004/0123063 A1 | 6/2004 | Dalal et al. | |
| 2004/0143713 A1 | 7/2004 | Niles et al. | |
| 2004/0225834 A1 | 11/2004 | Lu et al. | |
| 2004/0234000 A1 | 11/2004 | Page | |
| 2004/0260673 A1* | 12/2004 | Hitz et al. | 707/1 |
| 2004/0268068 A1 | 12/2004 | Curran et al. | |
| 2005/0010620 A1 | 1/2005 | Silvers et al. | |
| 2005/0097270 A1 | 5/2005 | Kleiman et al. | |
| 2005/0144202 A1 | 6/2005 | Chen | |
| 2005/0144381 A1 | 6/2005 | Corrado | |
| 2005/0235154 A1 | 10/2005 | Serret-Avila | |
| 2005/0273654 A1* | 12/2005 | Chen et al. | 714/13 |
| 2006/0085595 A1 | 4/2006 | Slater | |
| 2006/0112251 A1 | 5/2006 | Karr et al. | |
| 2006/0168409 A1 | 7/2006 | Kahn et al. | |
| 2006/0179218 A1* | 8/2006 | Burkey | 711/114 |
| 2006/0184821 A1* | 8/2006 | Hitz et al. | 714/6 |
| 2006/0218135 A1 | 9/2006 | Bisson et al. | |
| 2006/0218433 A1* | 9/2006 | Williams | 714/6 |
| 2006/0218644 A1 | 9/2006 | Niles et al. | |
| 2006/0256965 A1 | 11/2006 | Rowe | |
| 2007/0094464 A1 | 4/2007 | Sharma et al. | |
| 2007/0094465 A1 | 4/2007 | Sharma et al. | |
| 2007/0094466 A1 | 4/2007 | Sharma et al. | |
| 2008/0049504 A1 | 2/2008 | Kasahara et al. | |

OTHER PUBLICATIONS

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

Octavian Lascu et al, "Configuration and Tuning GPFS for Digital Media Environments", Nov. 2005, IBM International Technical Support Organization, p. 38. Available online: http://www.redbooks.ibm.com/redbooks/pdfs/sg246700.pdf.

"An Introduction to GPFS v1.3 for Linux", Jun. 2003. Available online: http://jumpdoc.fz-juelich.de/doc_pdf/gpfs21/GPFs-Linux-wp060303.pdf.

Sanjay Ghemawat et al, "The Google File System", 2003, ACM, p. 3.

Austin, B. "A Dynamic Disc Allocation Algorithm Designed to Reduce Fragmentation During File Reloading", Information Sciences Laboratory, Corporate Research and Development Center, General Electric Company, 4 Pages, 1970.

Goodheart, B., Cox, J. "The Magic Garden Explained" Prentice Hall, 8 Pages, 1994.

Stallings, W. "Computer Organization and Architecture: Designing for Performance", Prentice Hall, 4 Pages, 2000.

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

(56) References Cited

OTHER PUBLICATIONS

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Tsotras et al., "Efficient Management of Time-Evolving Databases", Aug. 1995, IEEE Transactions of Knowledge and Data Engineering, vol. 7, pp. 591-608 (18 pages).

* cited by examiner

METHOD AND SYSTEM FOR METADATA-BASED RESILVERING

CROSS-REFERENCE TO RELATED APPLICATIONS

This application claims benefit of U.S. Provisional Application Ser. No. 60/734,023 filed on Nov. 4, 2005, entitled "Dirty Time Logging and Resilvering" in the names of William H. Moore and Jeffrey S. Bonwick.

This application is related to copending U.S. patent application Ser. No. 11/407,773, filed on Apr. 19, 2006 and entitled "Method and System for Dirty Time Logging," copending U.S. patent application Ser. No. 11/407,744, filed on Apr. 19, 2006 and entitled "Method and System for Dirty Time Log Directed Resilvering," and copending U.S. patent application Ser. No. 11/409,427, filed on Apr. 19, 2006 and entitled "Method and System for Pruned Resilvering Using a Dirty Time Log," the entire contents of which are incorporated herein by reference. All the above referenced applications are co-owned by the same assignee.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; and "Automatic Conversion of All-Zero Data Storage Blocks into File Holes" (application Ser. No. 10/853,915) filed on May 26, 2004.

BACKGROUND

Typical computer systems include a file system for storing and accessing files. In addition to storing system files (operating system files, device driver files, etc.), the file system provides storage and access of user data files. If any of these files (system files and/or user files) contain critical data, then it becomes advantageous to employ a data backup scheme to ensure that critical data are not lost if a file storage device fails. One data backup scheme that is commonly employed is mirroring. Mirroring involves maintaining two or more copies of a file, where each copy of the file is located on a separate file storage device (e.g., a local hard disk, a networked hard disk, a network file server, etc.).

When one or more file storage devices fails for any length of time, the file storage device(s) may become unsynchronized. However, when employing a mirroring scheme, it is of critical importance to ensure that the mirrors are synchronized (i.e., that the contents of each mirror are the same). If a mirror becomes unsynchronized, the simplest recovery scheme involves copying all of the data from a synchronized mirror to the unsynchronized mirror. However, copying all data from one file storage device to another file storage device may take a long time and reduce performance of the file storage devices significantly during the resynchronization process.

Alternatively, dirty region logging (DRL) may be used to facilitate resynchronization. DRL involves dividing each mirror into a number of "regions." Depending on the implementation, the region may be as small as a single disk sector or larger than 256 kilobytes (KB). Prior to modifying the content of a region—for example, when there is a write operation on data within the region—a DRL entry for the region is created in the DRL. In most cases, the DRL entry merely identifies the region where the modification will be attempted. If the region is modified successfully, then the DRL entry is cleared. If the region is not modified successfully, then the DRL entry remains in the DRL. Thus, during a resynchronization process, the DRL may be used to identify which specific regions require resynchronization, rather than resynchronizing the entire file storage device.

Dirty region logging may be more time-efficient then resynchronizing an entire file storage device. However, it also includes system overhead with each modification to a region, since the DRL must be updated prior to each modification to the region. Clearly, this overhead increases with smaller region sizes. Conversely, if the regions are large, there may be significant overhead involved in resynchronizing an entire region, even though only a single disk sector in that region may have been modified.

SUMMARY

In general, in one aspect, the invention relates to a method for resilvering a storage pool. The method comprises determining whether any of a first plurality of blocks in the storage pool, comprising metadata, require resilvering, determining whether any of a second plurality of blocks in the storage pool, comprising data, require resilvering, resilvering all of the first plurality of blocks that require resilvering, and resilvering all of the second plurality of blocks that require resilvering, wherein all of the first plurality of blocks that require resilvering are resilvered prior to resilvering any of the second plurality of blocks.

In general, in one aspect, the invention relates to a system. The system comprises a storage pool, a first plurality of blocks in the storage pool, comprising metadata, a second plurality of blocks in the storage pool, comprising data, and a file system. The file system is configured to determine whether any of the first plurality of blocks require resilvering, determine whether any of the second plurality of blocks require resilvering, resilver all of the first plurality of blocks that require resilvering, and resilver all of the second plurality of blocks that require resilvering, wherein all of the first plurality of blocks that require resilvering are resilvered prior to resilvering any of the second plurality of blocks.

Other aspects of the invention will be apparent from the following description and the appended claims.

DETAILED DESCRIPTION

Figure 1:
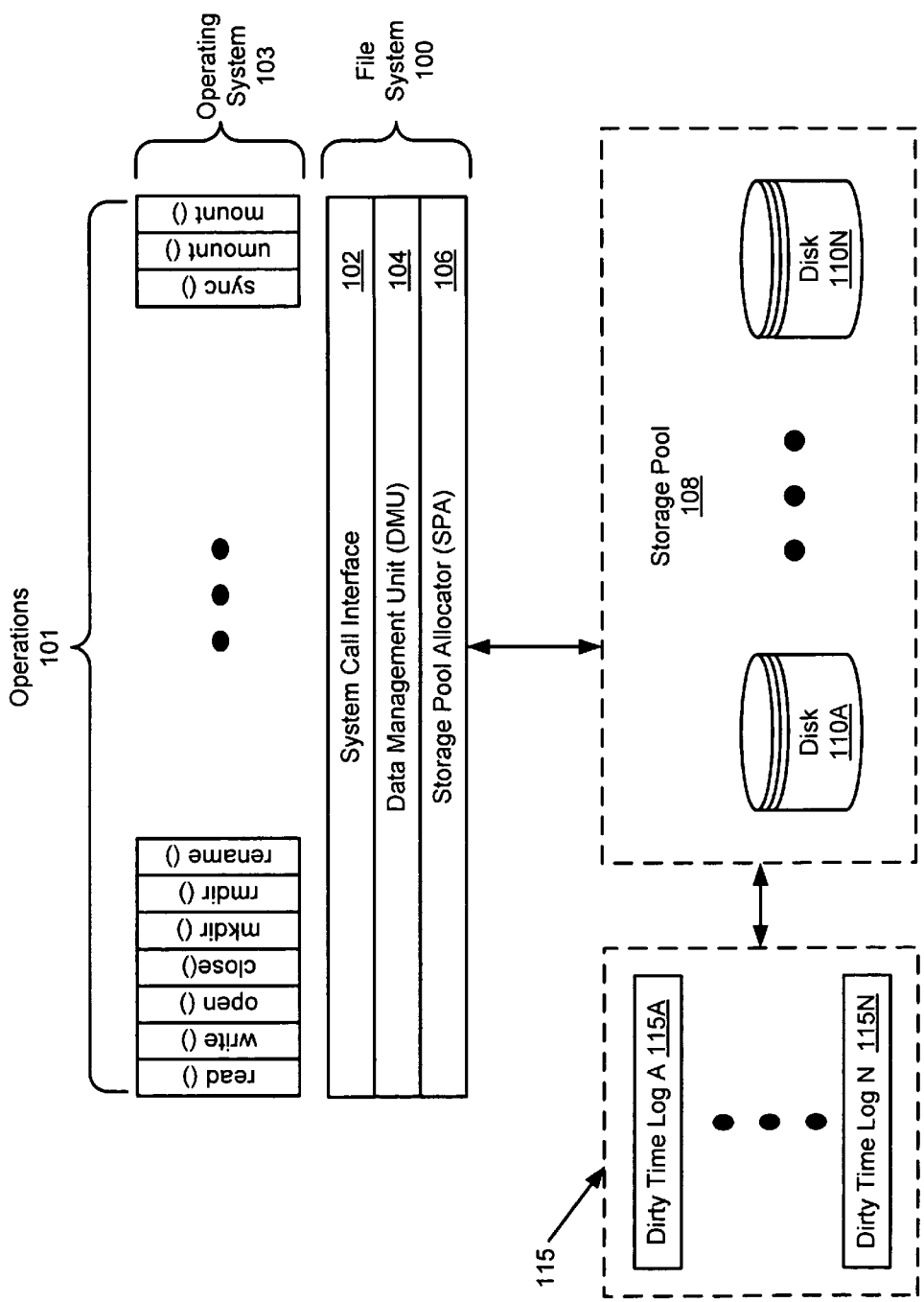
FIG. 1 shows a diagram of a system architecture in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to resilver a storage pool. Specifically, embodiments of the invention relate to resilvering a storage pool using a top-down approach; i.e., a parent block is resilvered before its child blocks are resilvered. More specifically, embodiments of the invention relate to resilvering blocks containing metadata before resilvering blocks containing data.

FIG. 1 shows a diagram of a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into input/output (hereinafter "I/O") requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (disks (110A, 110N)). Further, in one embodiment of the invention, the storage capacity of the storage pool (108) may increase and decrease dynamically as physical disks are added and removed from the storage pool (108). In one embodiment of the invention, the storage space available in the storage pool (108) is managed by the SPA (106).

As shown in FIG. 1, each of the disks (110A, 110N) in the storage pool (108) is associated with a dirty time log (DTL) (115A, 115N). In one embodiment of the invention, the DTL (115A, 115N) tracks the times during which I/O requests were not successfully completed (i.e., the data were not stored on the disk (110A, 110N)). For example, if the disk (e.g., 110A, 110N) goes offline from 10:00 am until 10:15 am, then the DTL (e.g., 115A, 115N) for the disk (e.g., 110A, 110N) will include an entry stating that the disk (e.g., 110A, 110N) was offline from 10:00 am until 10:15 am.

As an alternative to storing the actual time that the disk (e.g., 110A, 110N) was offline, each I/O request issued to the storage pool (108) may be associated with a transaction group number. Thus, instead of storing the actual time the disk (e.g., 110A, 110N) was offline, the DTL (e.g., 115A, 115N) may store the transaction group number(s) during which the disk (e.g., 110A, 110N) was offline. More specifically, the DTL (e.g., 115A, 115N) may store the transaction group number(s) during which I/O requests were not successfully completed for the disk (e.g., 110A, 110N). Accordingly, the use of "birth time" in the following descriptions may refer to either a time or a transaction group number.

Those skilled in the art will appreciate that a single DTL may be maintained for the entire storage pool (108), where each entry identifies the particular disk (e.g., 110A, 110N) and when the disk (e.g., 110A, 110N) was offline. In addition, those skilled in the art will appreciate that the DTLs (e.g., 115A, 115N) may be stored in any location in the system (e.g., in the storage pool (108), in memory, etc.). In one embodiment of the invention, the SPA (106) manages the DTL (e.g., 115A, 115N) (i.e., updates the contents of the DTL (e.g., 115A, 115N), etc.).

Figure 2:
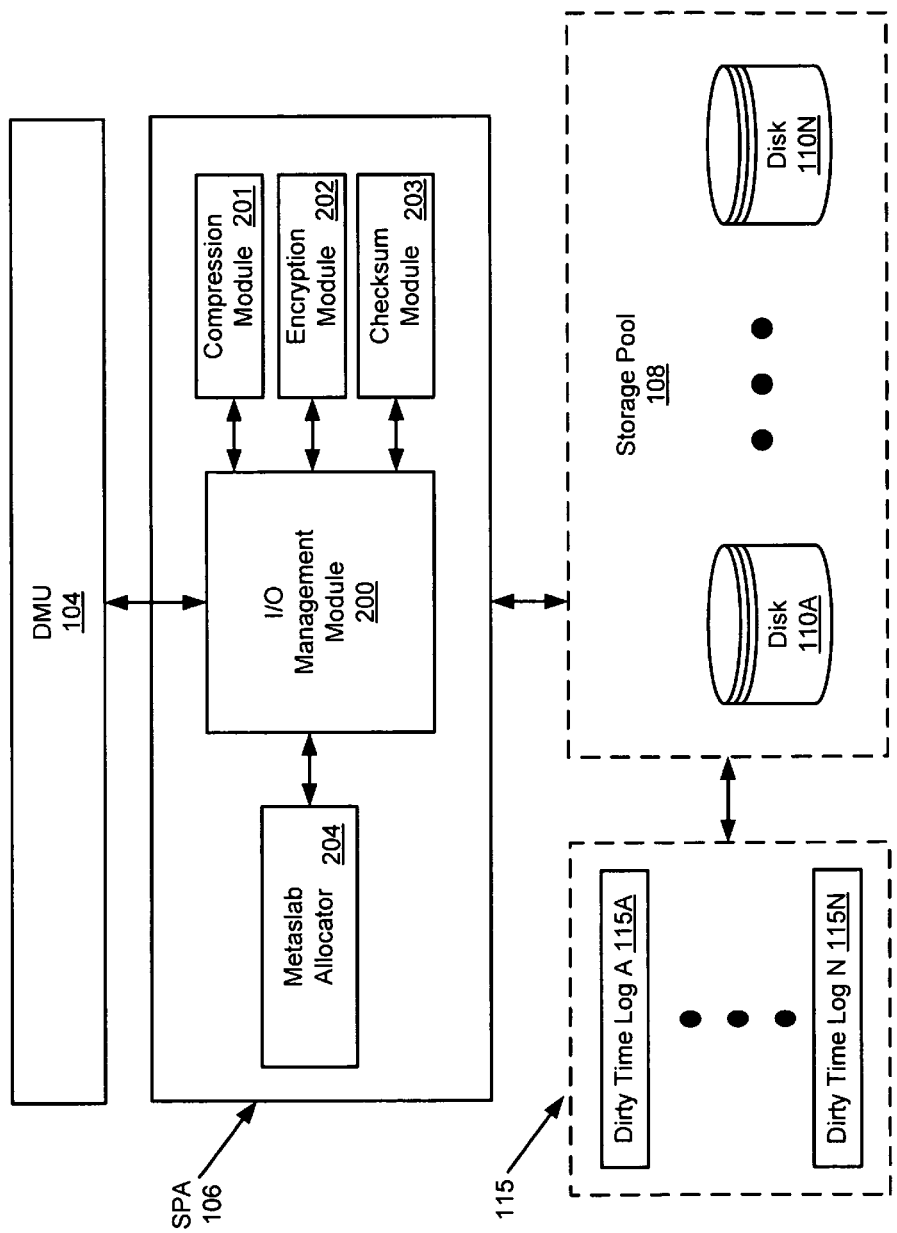
FIG. 2 shows a diagram of a storage pool allocator in accordance with one embodiment of the invention.

FIG. 2 shows a diagram of the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups, in accordance with one embodiment of the invention. The compression module (201) provides functionality to compress larger logical blocks (i.e., data blocks and indirect blocks) into smaller segments, where a segment is a region of physical disk space. For example, a logical block size of 8 KB may be compressed to a size of 2 KB for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool (108). The checksum may be used, for example, to ensure data has not been corrupted.

As discussed above, the SPA (106) provides an interface to the storage pool (108) and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool (108) by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3:
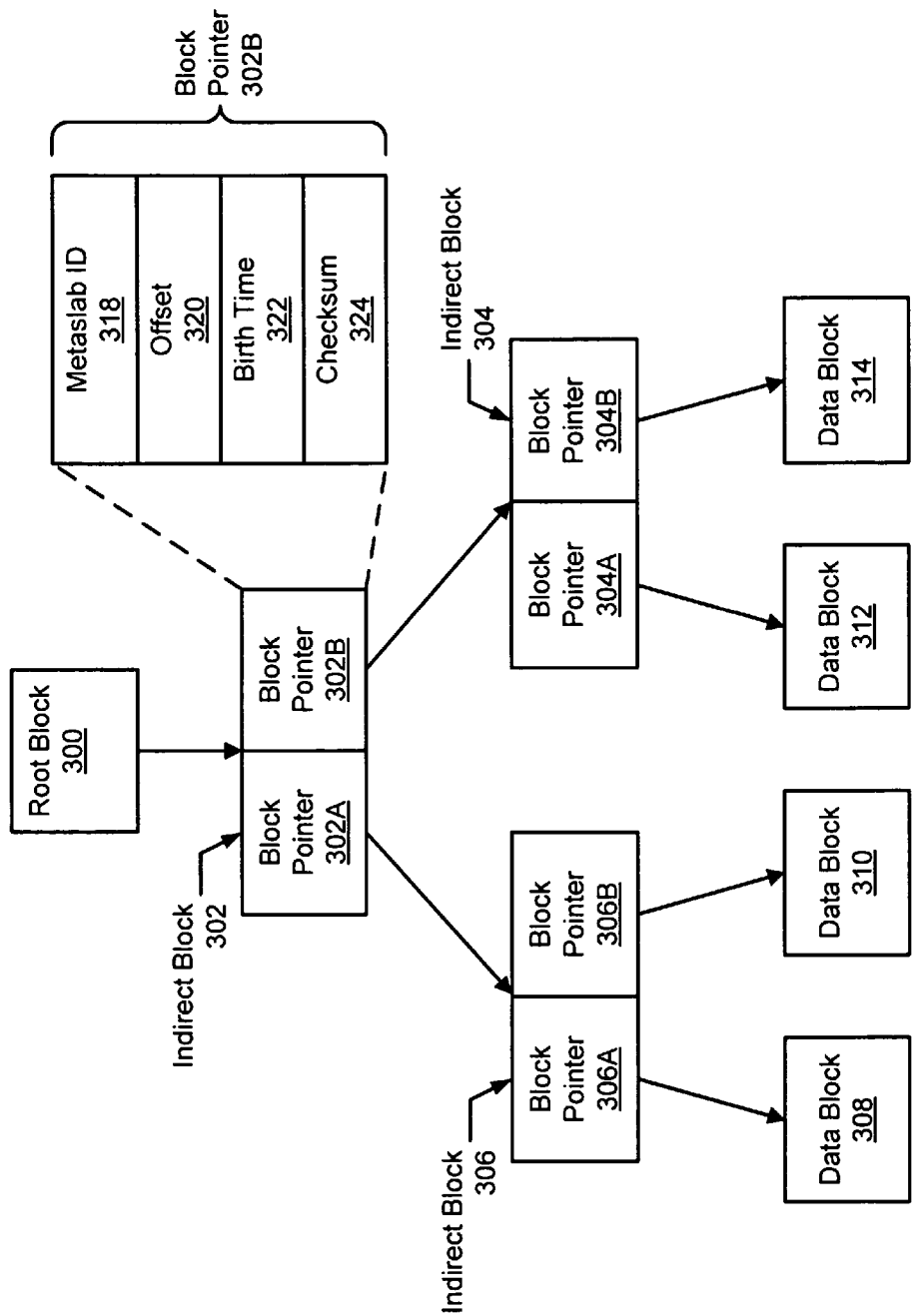
FIG. 3 shows a diagram of a hierarchical data configuration in accordance with one embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows a diagram of a hierarchical data configuration (hereinafter referred to as a "tree") for storing data blocks and indirect blocks within a storage pool (e.g., 108 in FIG. 1) in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (302A, 302B, 304A, 304B, 306A, 306B) that, directly or indirectly, reference data blocks (308, 310, 312, 314). The data blocks (308, 310, 312, 314) contain actual data of files stored in the storage pool. One skilled in the art will appreciate that several layers of indirect blocks may exist between the root block (300) and the data blocks (308, 310, 312, 314).

In contrast to the root block (300), indirect blocks (302, 304, 306) and data blocks (308, 310, 312, 314) may be located anywhere in the storage pool. In one embodiment of the invention, the root block (300) and each block pointer (302A, 302B, etc.) include data as shown in the expanded diagram of block pointer (302B). One skilled in the art will appreciate that data blocks (308, 310, 312, 314) do not include this information; rather, data blocks (308, 310, 312, 314) contain actual data of files within the file system (e.g., 100 in FIG. 1).

In one embodiment of the invention, each block pointer (e.g., 302A, 302B, etc.) includes a metaslab ID (318), an offset (320) within the metaslab, a birth time (322) of the block (i.e., data block or indirect block) referenced by the block pointer, and a checksum (324) of the data stored in the referenced block. In one embodiment of the invention, the metaslab ID (318) and offset (320) are used to determine the location of the referenced block in the storage pool. The metaslab ID (318) identifies a particular metaslab. More specifically, the metaslab ID (318) may identify the particular disk within the storage pool upon which the metaslab resides and the location on the disk where the metaslab begins. The offset (320) may then be used to reference a particular segment within the metaslab. In one embodiment of the invention, the data within the segment referenced by the particular metaslab ID (318) and offset (320) may correspond to either a data block or an indirect block. If the data corresponds to an indirect block, then the metaslab ID (318) and offset (320) within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
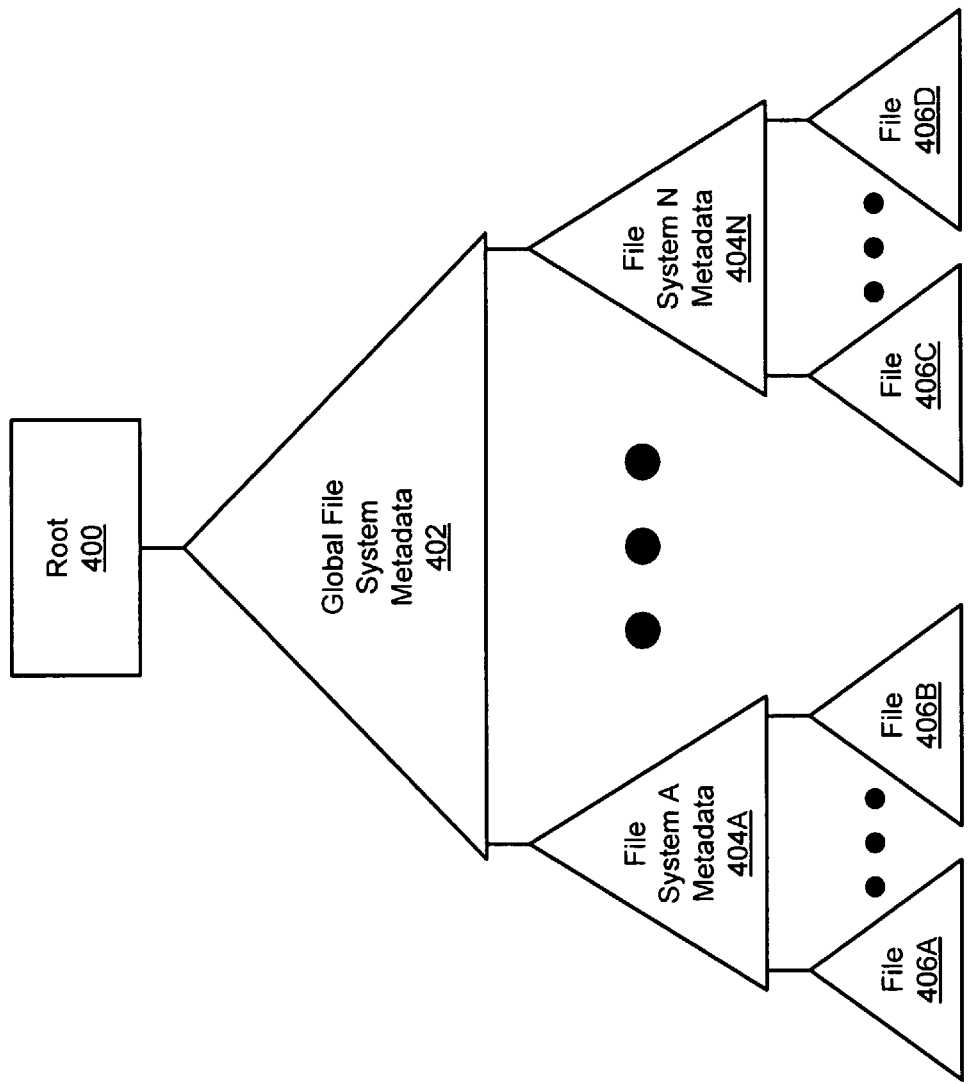
FIG. 4 shows a diagram of a hierarchical data configuration in accordance with one embodiment of the invention.

FIG. 4 shows a diagram of a hierarchical data configuration in accordance with one embodiment of the invention. More specifically, FIG. 4 shows a diagram of a hierarchical data configuration for a storage pool including both metadata and files (i.e., data). As shown in FIG. 4, all the metadata and data in the storage pool are referenced directly or indirectly by a root (400). The root (400) directly references global file system metadata (402). In one embodiment of the invention, the global file system metadata (402) is organized in a hierarchical tree where the root (400) references the root of the global file system metadata (402), and the leaf nodes of the global file system metadata (402) correspond to root nodes (not shown) of the file system metadata (404A, 404N).

In one embodiment of the invention, the file system metadata (404A, 404N) corresponds to metadata associated with the individual file system. In one embodiment of the invention, the file system metadata (404A, 404N) is organized in a hierarchical tree where the leaf nodes of the file system metadata (404A, 404N) correspond to root nodes (not shown) of the individual files (406A, 406B, 406C, 406D). In one embodiment of the invention, each file is organized in a hierarchical tree structure (see, e.g., FIG. 3). Accordingly, in one embodiment of the invention, each file includes additional metadata associated with the file.

Figure 5:
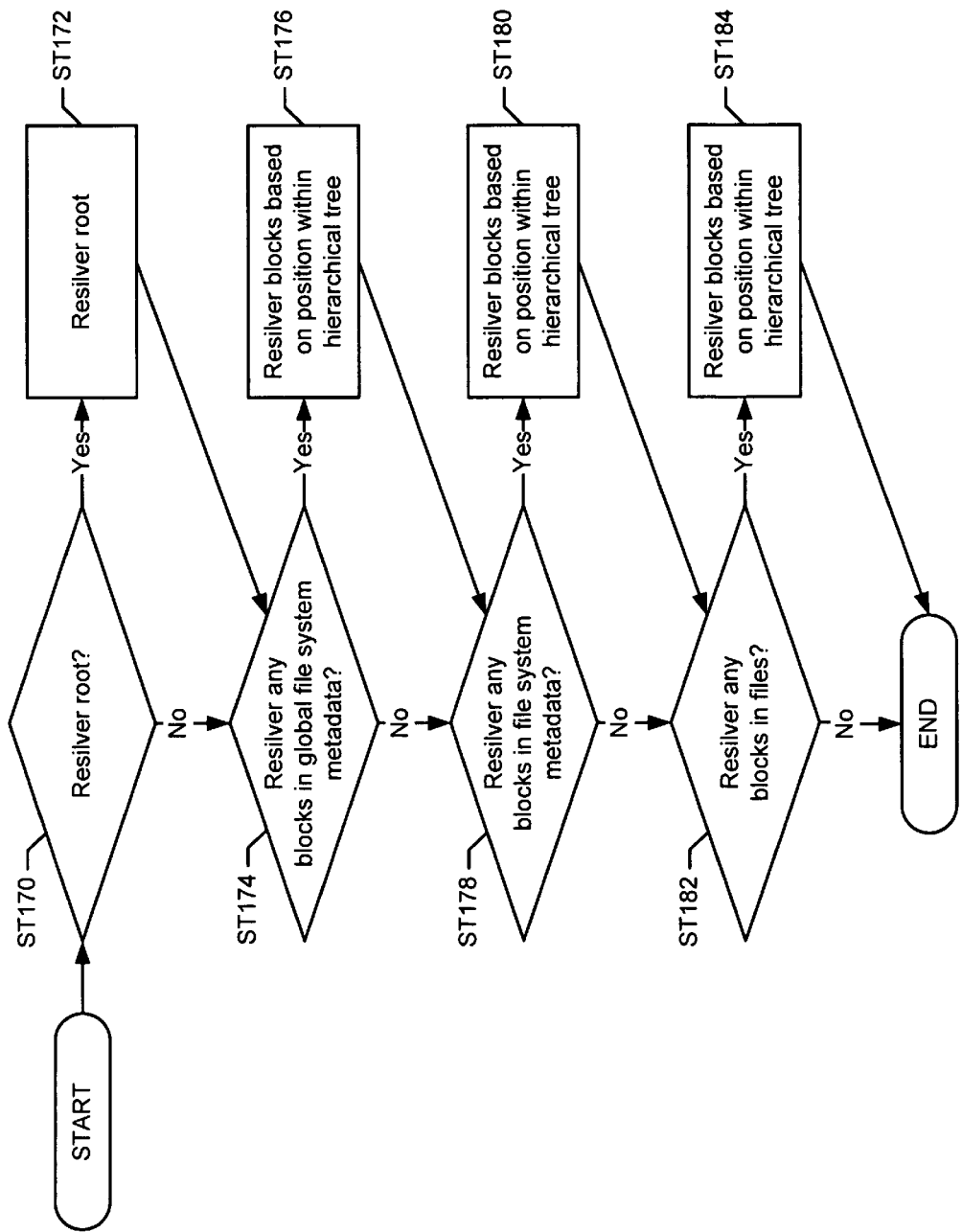
FIG. 5 shows a flow chart in accordance with one embodiment of the invention.

FIG. 5 shows a flow chart in accordance with one embodiment of the invention. More specifically, FIG. 5 shows a flow chart of a method for resilvering metadata and data in a storage pool in accordance with one embodiment of the invention. In one embodiment of the invention, the metadata in the storage pool are resilvered prior to resilvering the data in the storage pool.

Turning to FIG. 5, initially, a determination is made about whether the root (e.g., 400 in FIG. 4) requires resilvering (ST170). In one embodiment of the invention, the aforementioned determination may be made using a dirty time log (DTL) (e.g., 140 in FIG. 1), a conventional method for determining whether to resilver a block (e.g., a dirty region log), or any combination thereof. Those skilled in the art will appreciate that the method of FIG. 5 is not limited to any particular method for determining whether to resilver a block.

Detailed descriptions of the use of a dirty time log (DTL) for resilvering can be found in copending U.S. patent application Ser. No. 11/407,773, filed on Apr. 19, 2006 entitled "Method and System for Dirty Time Logging," copending U.S. patent application Ser. No. 11/407,744, filed on Apr. 19, 2006 and entitled "Method and System for Dirty Time Log Directed Resilvering," and copending U.S. patent application Ser. No. 11/409,427, filed on Apr. 19, 2006 and entitled "Method and System for Pruned Resilvering Using a Dirty Time Log."

If the root requires resilvering, then the root is subsequently resilvered (ST172). Regardless of whether the root is resilvered, a determination is then made about whether any of the blocks included in the global file system metadata (e.g., 402 in FIG. 4) require resilvering (ST174). In one embodiment of the invention, the aforementioned determination may be made using a dirty time log (DTL), as described above, a conventional method for determining whether to resilver a block (e.g., a dirty region log), or any combination thereof.

If one or more blocks included in the global file system metadata require resilvering, then the aforementioned blocks are resilvered, based on their position in the hierarchical tree in which the blocks are organized (ST176). In particular, in one embodiment of the invention, the blocks higher in the hierarchical tree (i.e., blocks closer to the root) are resilvered before the blocks lower in the hierarchical tree (i.e., blocks further away from the root).

Regardless of whether any blocks included in the global file system metadata are resilvered, a determination is then made about whether any of the blocks included in the file system metadata (e.g., 404A, 404N in FIG. 4) require resilvering (ST178). In one embodiment of the invention, the aforementioned determination may be made using a dirty time log (DTL), as described above, a conventional method for determining whether to resilver a block (e.g., a dirty region log), or any combination thereof.

If one or more blocks included in the file system metadata require resilvering, then the aforementioned blocks are resilvered, based on their position in the hierarchical tree in which the blocks are organized (ST180). In particular, in one embodiment of the invention, the blocks higher in the hierarchical tree (i.e., blocks closer to the root) are resilvered before the blocks lower in the hierarchical tree (i.e., blocks further away from the root). Those skilled in the art will appreciate that file system metadata (e.g., 404A, 404N) may be resilvered in parallel, sequentially, or any combination thereof.

Regardless of whether any blocks included in the file system metadata are resilvered, a determination is then made about whether any of the blocks included in the files (e.g., 406A, 406B, 406C, 406D) require resilvering (ST182). In one embodiment of the invention, the aforementioned determination may be made using a dirty time log (DTL), as described above, a conventional method for determining whether to resilver a block (e.g., a dirty region log), or any combination thereof.

If one or more blocks included in the files require resilvering, then the aforementioned blocks are resilvered, based on their position in the hierarchical tree in which the blocks are organized (ST184). In particular, in one embodiment of the invention, the blocks higher in the hierarchical tree (i.e., blocks closer to the root) are resilvered before the blocks lower in the hierarchical tree (i.e., blocks further away from the root). Those skilled in the art will appreciate that blocks higher in the hierarchical tree may include metadata, while blocks lower in the hierarchical tree may include data. Further, those skilled in the art will appreciate that blocks included in each file (e.g., 406A, 406B, 406C, 406D) may be resilvered in parallel, sequentially, or any combination thereof.

Once ST182 and/or ST184 are completed, all the metadata and data in the storage pool have been resilvered (i.e., all blocks in the storage pool requiring resilvering have been resilvered). Those skilled in the art will appreciate that because metadata are resilvered before data, the method of FIG. 5 ensures that a resilvered data block is both valid and accessible once it is resilvered. Further, because blocks are resilvered based on their position in the hierarchical tree, the file system may easily recover from any failure during the resilvering process.

Figure 6:
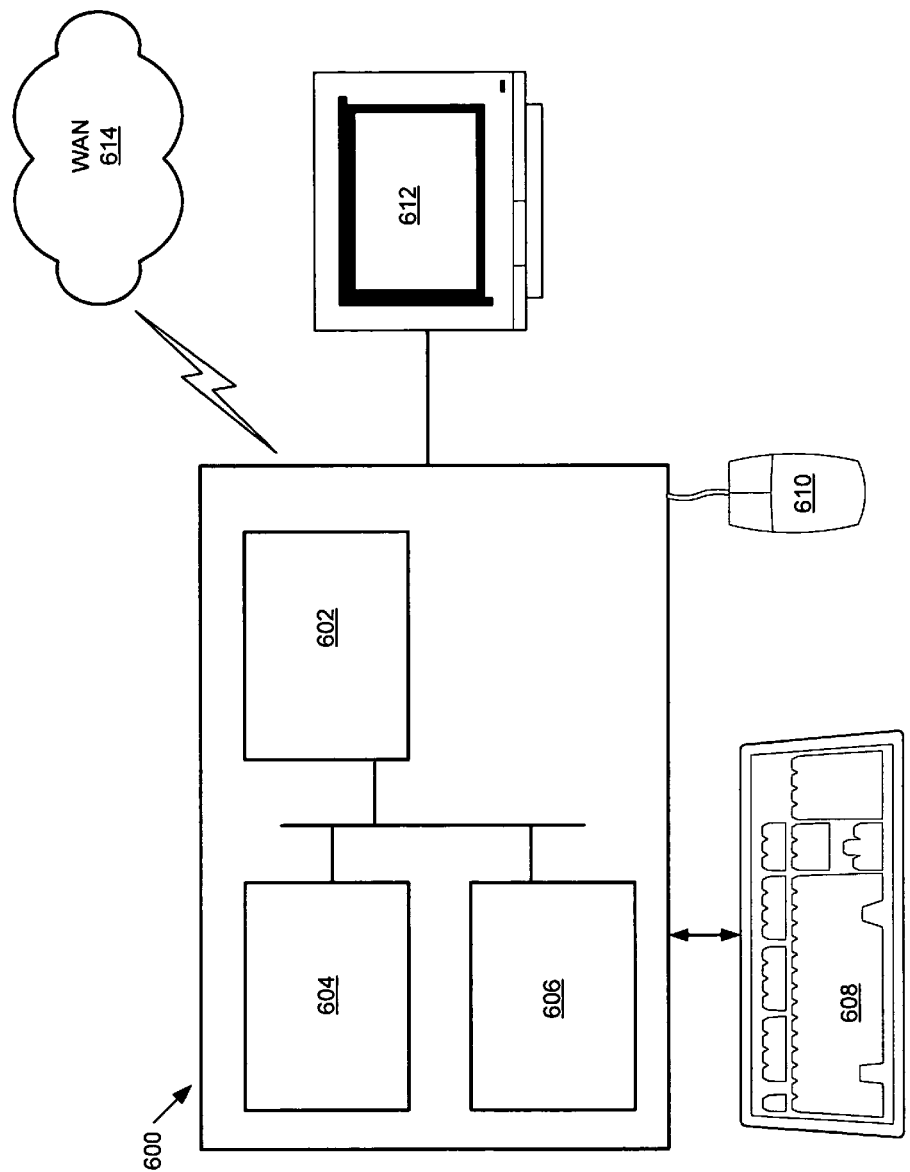
FIG. 6 shows a diagram of a computer system in accordance with one embodiment of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) may be connected to a local area network (LAN) or a wide area network (e.g., the Internet) (614) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., operating system, file system, system call interface, DMU, SPA, storage pool, disk, dirty time log, metaslab allocator, I/O management module, compression module, encryption module, checksum module, root block, data block, indirect block, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for resilvering a storage pool, comprising:
   determining whether any of a first plurality of blocks in the storage pool, comprising metadata, require resilvering, wherein resilvering comprises synchronizing unsynchronized data on mirrored disks in the storage pool;
   determining whether any of a second plurality of blocks in the storage pool, comprising data, require resilvering;
   resilvering all of the first plurality of blocks that require resilvering; and
   resilvering all of the second plurality of blocks that require resilvering, wherein all of the first plurality of blocks that require resilvering are resilvered prior to resilvering any of the second plurality of blocks, wherein the first plurality of blocks comprises:
- a root block;
- a third plurality of blocks comprising global file system metadata, wherein the root block references a block in the third plurality of blocks and wherein the global file system metadata comprises metadata for a plurality of file systems; and
- a fourth plurality of blocks comprising file system metadata, wherein a block in the third plurality of blocks references a block in the fourth plurality of blocks, wherein the file system metadata is associated with one of the plurality of file systems, and wherein unsynchronized global file system metadata in the third plurality of blocks is resilvered prior to unsynchronized file system metadata in the fourth plurality of blocks, and wherein the second plurality of blocks comprises:
- a plurality of file root blocks, each file root block of the plurality of file root blocks being for a single file in the one of the plurality of file systems, wherein each file root block is referenced by a block in the fourth plurality of blocks,
- a fifth plurality of blocks comprising file metadata for the corresponding single file, wherein each of the fifth plurality of blocks is referenced by one of the plurality of file root blocks, and
- a sixth plurality of blocks comprising data for the corresponding single file, wherein a block in the fifth plurality of blocks references a block in the sixth plurality of blocks, and wherein unsynchronized file metadata in the fifth plurality of blocks is resilvered prior to unsynchronized file system data in the sixth plurality of blocks.

2. The method of claim 1, wherein the root block is resilvered prior to resilvering any of the third plurality of blocks and the fourth plurality of blocks.

3. The method of claim 2, wherein all of the third plurality of blocks that require resilvering are resilvered prior to resilvering any of the fourth plurality of blocks.

4. The method of claim 1, wherein resilvering all of the first plurality of blocks that require resilvering comprises using a dirty time log (DTL), wherein the DTL comprises a birth time corresponding to a transaction group associated with an input/output (I/O) request to store a block in the first plurality of blocks.

5. The method of claim 4, wherein the DTL is associated with a first disk in the storage pool, and wherein resilvering a block in the first plurality of blocks comprises updating the block using data from a second disk in the storage pool.

6. A system, comprising:
a storage pool;
a first plurality of blocks in the storage pool, comprising metadata;
a second plurality of blocks in the storage pool, comprising data; and
a file system configured to:
 determine whether any of the first plurality of blocks require resilvering, wherein resilvering comprises synchronizing unsynchronized data on mirrored disks in the storage pool;
 determine whether any of the second plurality of blocks require resilvering;
 resilver all of the first plurality of blocks that require resilvering; and
 resilver all of the second plurality of blocks that require resilvering, wherein all of the first plurality of blocks that require resilvering are resilvered prior to resilvering any of the second plurality of blocks, wherein the first plurality of blocks comprises:
- a root block;
- a third plurality of blocks comprising global file system metadata, wherein the root block references a block in the third plurality of blocks and wherein the global file system metadata comprises metadata for a plurality of file systems; and
- a fourth plurality of blocks comprising file system metadata, wherein a block in the third plurality of blocks references a block in the fourth plurality of blocks, wherein the file system metadata is associated with one of the plurality of file systems, and wherein unsynchronized global file system metadata in the third plurality of blocks is resilvered prior to unsynchronized file system metadata in the fourth plurality of blocks, and wherein the second plurality of blocks comprises:
- a plurality of file root blocks, each file root block of the plurality of file root blocks being for a single file in the one of the plurality of file systems, wherein each file root block is referenced by a block in the fourth plurality of blocks,
- a fifth plurality of blocks comprising file metadata for the corresponding single file, wherein each of the fifth plurality of blocks is referenced by one of the plurality of file root blocks, and
- a sixth plurality of blocks comprising data for the corresponding single file, wherein a block in the fifth plurality of blocks references a block in the sixth plurality of blocks, and wherein unsynchronized file metadata in the fifth plurality of blocks is resilvered prior to unsynchronized file system data in the sixth plurality of blocks.

7. The system of claim 6, wherein the file system resilvers the root block prior to resilvering any of the third plurality of blocks and the fourth plurality of blocks.

8. The system of claim 7, wherein the file system resilvers all of the third plurality of blocks that require resilvering prior to resilvering any of the fourth plurality of blocks.

9. The system of claim 6, further comprising:
a dirty time log (DTL), wherein the file system resilvers all of the first plurality of blocks that require resilvering using the DTL, wherein the DTL is configured to store a birth time corresponding to a transaction group associated with an input/output (I/O) request to store a block in the first plurality of blocks.

10. The system of claim 9, further comprising:
a first disk in the storage pool, associated with the DTL and configured to store the first plurality of blocks; and
a second disk in the storage pool, wherein resilvering a block in the first plurality of blocks comprises updating the block using data from the second disk.

11. A non-transitory computer readable medium comprising executable instructions for resilvering a storage pool by:
determining whether any of a first plurality of blocks in the storage pool, comprising metadata, require resilvering, wherein resilvering comprises synchronizing unsynchronized data on mirrored disks in the storage pool;
determining whether any of a second plurality of blocks in the storage pool, comprising data, require resilvering;
resilvering all of the first plurality of blocks that require resilvering; and resilvering all of the second plurality of blocks that require resilvering, wherein all of the
first plurality of blocks that require resilvering are resilvered prior to resilvering any of the second plurality of blocks;
wherein the first plurality of blocks comprises: a root block;
a third plurality of blocks comprising global file system metadata, wherein the root block references a block in the third plurality of blocks and wherein the global file system metadata comprises metadata for a plurality of file systems; and
a fourth plurality of blocks comprising file system metadata, wherein a block in the third plurality of blocks references a block in the fourth plurality of blocks, wherein the file system metadata is associated with one of the plurality of file systems, and wherein unsynchronized global file system metadata in the third plurality of blocks is resilvered prior to unsynchronized file system metadata in the fourth plurality of blocks, and
wherein the second plurality of blocks comprises:
a plurality of file root blocks, each file root block of the plurality of file root blocks being for a single file in the one of the plurality of file systems, wherein each file root block is referenced by a block in the fourth plurality of blocks,
a fifth plurality of blocks comprising file metadata for the corresponding single file, wherein each of the fifth plurality of blocks is referenced by one of the plurality of file root blocks, and a sixth plurality of blocks comprising data for the corresponding single file, wherein a block in the fifth plurality of blocks references a block in the sixth plurality of blocks, and wherein unsynchronized file metadata in the fifth plurality of blocks is resilvered prior to unsynchronized file system data in the sixth plurality of blocks.

12. The non-transitory computer readable medium of claim 11, wherein the root block is resilvered prior to resilvering any of the third plurality of blocks and the fourth plurality of blocks.

13. The non-transitory computer readable medium of claim 12, wherein all of the third plurality of blocks that require resilvering are resilvered prior to resilvering any of the fourth plurality of blocks.

14. The non-transitory computer readable medium of claim 11, wherein resilvering all of the first plurality of blocks that require resilvering comprises using a dirty time log (DTL), wherein the DTL is associated with a first disk in the storage pool, and wherein resilvering a block in the first plurality of blocks comprises updating the block using data from a second disk in the storage pool.

15. The non-transitory computer readable medium of claim 14, wherein the DTL is associated with a first disk in the storage pool, and wherein resilvering a block in the first plurality of blocks comprises updating the block using data from a second disk in the storage pool.

* * * * *